United States Patent [19]

Dischö

[11] Patent Number: 5,596,036
[45] Date of Patent: Jan. 21, 1997

[54] HARDENABLE ACRYLIC MONOMER COMPOSITIONS

[75] Inventor: Karoly Dischö, Effretikon, Switzerland

[73] Assignee: Sandoz Ltd., Basel, Switzerland

[21] Appl. No.: 479,054

[22] Filed: Jun. 6, 1995

Related U.S. Application Data

[63] Continuation of Ser. No. 309,276, Sep. 20, 1994, abandoned, which is a continuation of Ser. No. 135,040, Oct. 12, 1993, abandoned, which is a continuation-in-part of Ser. No. 897,209, Jun. 11, 1992, abandoned.

[30] Foreign Application Priority Data

Jun. 14, 1991 [DE] Germany .......................... 41 19 646.5
Jun. 14, 1991 [DE] Germany .......................... 41 19 647.3
Jun. 14, 1991 [DE] Germany .......................... 41 19 648.1

[51] Int. Cl.$^6$ .......................... C08K 3/04; C08L 67/00; C08L 33/06; C08F 26/02
[52] U.S. Cl. .......................... 524/496; 524/495; 524/513; 524/832; 524/847; 524/914; 526/283; 526/284; 526/301; 526/320
[58] Field of Search ...................... 524/495, 496, 524/513, 832, 847, 914; 526/283, 284, 301, 320

[56] References Cited

U.S. PATENT DOCUMENTS

| | | | |
|---|---|---|---|
| 3,256,229 | 6/1966 | Janota et al. | 524/5 |
| 3,538,036 | 11/1970 | Peters et al. | 524/5 |
| 3,731,791 | 5/1973 | Fourcade et al. | 206/219 |
| 4,097,677 | 6/1978 | Emmons et al. | 560/220 |
| 4,141,868 | 2/1979 | Emmons et al. | 524/237 |
| 4,145,503 | 3/1979 | Emmons et al. | 526/282 |
| 4,197,225 | 4/1980 | Emmons et al. | 524/650 |
| 4,261,872 | 4/1981 | Emmons et al. | 525/15 |
| 4,299,761 | 11/1981 | Emmons et al. | 524/853 |
| 4,400,413 | 8/1983 | Emmons et al. | 427/136 |
| 4,460,625 | 7/1984 | Emmons et al. | 427/136 |
| 4,544,730 | 10/1985 | O'Connor et al. | 524/495 |
| 4,556,701 | 12/1985 | Schindler et al. | 524/313 |
| 4,932,750 | 6/1990 | Ansel et al. | 427/513 |
| 5,069,721 | 3/1991 | Tamura et al. | 106/724 |

FOREIGN PATENT DOCUMENTS

| | | |
|---|---|---|
| 0095182 | 11/1983 | European Pat. Off. . |
| 0102830 | 3/1984 | European Pat. Off. . |
| 0111280 | 6/1984 | European Pat. Off. . |
| 0419658 | 4/1991 | European Pat. Off. . |
| 0441383 | 8/1991 | European Pat. Off. ........ 526/301 |
| 2095629 | 2/1992 | France . |
| 97896 | 5/1973 | German Dem. Rep. . |
| 158768 | 2/1983 | German Dem. Rep. . |
| 1569345 | 5/1970 | Germany . |
| 1769792 | 9/1971 | Germany . |
| 2028889 | 12/1971 | Germany . |
| 2029898 | 12/1971 | Germany . |
| 2155232 | 5/1973 | Germany . |
| 2209149 | 9/1973 | Germany . |
| 2627081 | 1/1977 | Germany . |
| 2801932 | 7/1979 | Germany . |
| 2846573 | 5/1980 | Germany . |
| 2929849 | 6/1980 | Germany . |
| 3030914 | 4/1982 | Germany . |
| 3224811 | 1/1983 | Germany . |
| 3212238 | 10/1983 | Germany . |
| 3248571 | 7/1984 | Germany . |
| 3344242 | 6/1985 | Germany . |
| 3442646 | 5/1986 | Germany . |
| 3603628 | 4/1987 | Germany . |
| 3822202 | 1/1990 | Germany . |
| 3901874 | 7/1990 | Germany . |
| 3913168 | 10/1990 | Germany . |
| 3924047 | 1/1991 | Germany . |
| 3935204 | 4/1991 | Germany . |
| 3940309 | 6/1991 | Germany . |
| 50-122527 | 9/1975 | Japan . |
| 49-092170 | 8/1983 | Japan . |
| 60-147408 | 8/1985 | Japan . |
| 0129306 | 7/1987 | Japan . |
| 62-129306 | 11/1987 | Japan . |
| 1-141851 | 6/1989 | Japan . |
| 1-257153 | 10/1989 | Japan . |
| 0255117 | 11/1991 | Japan ...................... 526/301 |
| 617346 | 5/1980 | Switzerland . |
| 424836 | 4/1974 | U.S.S.R. . |
| 835987 | 5/1979 | U.S.S.R. . |
| 996378 | 2/1983 | U.S.S.R. . |
| 1209672 | 2/1986 | U.S.S.R. . |
| 1465432 | 3/1989 | U.S.S.R. . |
| 1701686 | 12/1991 | U.S.S.R. . |
| 1220633 | 1/1971 | United Kingdom . |
| 2220204 | 1/1990 | United Kingdom . |

*Primary Examiner*—Peter A. Szekely
*Attorney, Agent, or Firm*—Robert S. Honor; Carl W. Battle; Carol A. Loeschorn

[57] ABSTRACT

A hardenable composition suitable for flooring and for coating concrete surfaces comprising (a) an acrylic binder comprising a (meth)acrylic ester of the formula

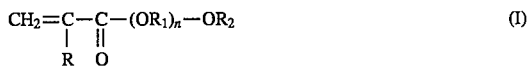

where $R_1$ is $C_{2-6}$alkylene, n is 0–3 and $R_2$ is a radical of an aromatic or alicyclic dicarboxylic acid ester or a dicyclopentenyl radical, n being 0 only when $R_2$ is a dicyclopentenyl radical, and (b) a component which is one or both (preferably both) of carbon black and a polyfunctional aliphatic or aromatic polyester- or polyether- urethane oligomer. The composition also preferably comprises aggregate such as sand. The compositions have excellent impact resistance and flexural strength.

15 Claims, No Drawings

HARDENABLE ACRYLIC MONOMER COMPOSITIONS

This is a continuation of application Ser. No. 08/309,276, filed Sep. 20, 1994, now abandoned, which in turn is a continuation of application Ser. No. 08/135,040, filed Oct. 12, 1993, now abandoned, which in turn is a continuation-in-part of application Ser. No. 07/897,209, filed Jun. 11, 1992, now abandoned.

This invention relates to hardenable monomer compositions of the type used to provide flooring or to coat concrete objects.

A common type of composition for use in flooring and in the coating of concrete surfaces comprises a blend of at least one cross-linkable acrylic monomer and at least one coarse filler, usually sand. This type of composition, sometimes referred to in the art as "polymer concrete", is noted for its excellent mechanical properties.

It has now been found that it is possible to prepare compositions of this type with enhanced properties. There is therefore provided, according to the present invention, hardenable monomer composition for use in flooring and in the coating of concrete surfaces, comprising (a) an acrylic monomer binder which comprises a (meth)acrylic ester of the Formula I

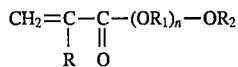     (I)

wherein

R is hydrogen or methyl;

$R_1$ is $C_{2-6}$ alkylene;

n is an integer of from 0–3; and $R_2$ is a radical of an aromatic or alicyclic dicarboxylic acid ester or a dicyclopentenyl radical, n being able to be 0 only when $R_2$ is a dicyclopentenyl radical; and (b) at least one component selected from the group consisting of (i) carbon blacks with a BET surface area of from 20–460 $M^2$/g, this being present to the extent of from 0.01–7, preferably 0.01–3, more preferably 0.1–0.5, weight % of the acrylic monomer; and (ii) aliphatic and aromatic polyester- and polyetherurethane oligomers of molecular weight 500–5000 and a viscosity of 2,000–100,000 mPa s at 25° C., having at least two ethylenically unsaturated double bonds, said oligomer being present in an amount of 7–60% by weight, said weight based on the total weight of the acrylic binder and oligomer.

In another embodiment of the present invention, the hardenable monomer compositions comprise (a) an acrylic monomer binder which comprises a (meth)acrylic ester of the Formula I

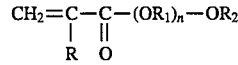     (I)

wherein

R is hydrogen or methyl;

$R_1$ is $C_{2-6}$ alkylene;

n is an integer of from 0–3; and $R_2$ is a radical of an aromatic or alicyclic dicarboxylic acid ester or a dicyclopentenyl radical, n being able to be 0 only when $R_2$ is a dicyclopentenyl radical; and (b) at least one component selected from the group consisting of (i) carbon blacks with a BET surface area of from 20–460 $M^2$/g, this being present to the extent of from 0.01–7, preferably 0.01–3, more preferably 0.1–0.5, weight % of the acrylic monomer; and (ii) aliphatic and aromatic polyester- and polyetherurethane oligomers of molecular weight 500–5000 and a viscosity of 2,000–100,000 mPa s at 25° C., having at least two ethylenically unsaturated double bonds, said oligomer being present in an amount of 7–60% by weight, said weight based on the total weight of the acrylic binder and oligomer, provided that when $R_2$ is a cyclopentenyl radical (b) comprises carbon black or the acrylic monomer binder additionally includes an acrylic or (meth)acrylic acid ester other than that of Formula (I).

Binders which are useful in the compositions of this invention comprise acrylic monomers which, when mixed with catalysts, harden within a few hours to form polymers. Such acrylic monomers include esters of (meth)acrylic acid, preferably methacrylic acid, and suitable examples have been described in, for example, EP 47120, U.S. Pat. Nos. 4,460,625, 4,097,677, 4,299,761, 4,400,413 and GB 2,220,204 the disclosure of which are incorporated herein by reference. Binders suitable for use in this invention comprise monomers of formula I

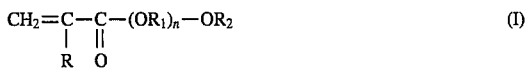     (I)

wherein

R is hydrogen or methyl, $R_1$ is an alkylene group with 2 to 6 C-atoms, n is an integer of from 0 to 3, and $R_2$ is a radical of an aromatic or alicyclic dicarboxylic acid ester or a dicyclopentenyl radical, n being able to be 0 only when $R_2$ is a dicyclopentenyl radical.

Preference is given to those monomers of formula I in which R is methyl, $R_1$ is a branched alkylene group with 3 or 4 C-atoms, n is 1 and $R_2$ is the radical of a tetrahydrophthalic acid, which in addition is esterified with an alkanol, preferably a $C_{1-6}$ alkanol, more preferably methanol or ethanol. A particularly preferred monomer is the ester of tetrahydrophthalic acid monomethyl ester and hydroxypropyl methacrylate.

(Meth)acrylic esters according to formula I may constitute the entire binder, or they may be mixed with other esters of acrylic or methacrylic acid. This allows the balance of properties of the composition to be adjusted. Examples of such esters are the hydroxyalkyl methacrylates, particularly hydroxypropyl methacrylate. Based on the total amount of monomers, the (meth)acrylates of the formula I preferably comprise 20 to 100 percent by weight, more preferably 50–95 percent by weight, and other (meth)acrylate esters preferably comprise up to 80 percent by weight, more preferably 5–50 percent by weight, based on total weight of a binder monomer. In flooring applications, the acrylic monomer binder preferably includes at least one additional acrylic or (meth)acrylic ester to impart a desired property, e.g. an acrylated epoxy to provide enhanced alkaline resistance.

The catalysts which may be used for crosslinking or hardening of the preparations according to the invention include organic peroxides or hydrogen peroxides of hydrocarbons with 3–18 carbon atoms which are soluble in the monomers, salts or complexes of transition metals and/or aromatic amines as polymerization catalysts. The peroxides or hydrogen peroxides are present in quantities of 0.1 to 5 percent by weight, the salts or complexes of transition metals in quantities of 0.0005 to 2 percent by weight and the aromatic amines in quantities of 0.1 to 5 percent by weight of the total weight of acrylic monomers. Examples of suitable peroxides include benzoyl peroxide, tert.-butyl perbenzoate, dilauryl peroxide and 2,2-bis-(tert.-butylperoxy)-butane. Suitable hydrogen peroxides are tert.-butyl hydrogen peroxide, cumene hydrogen peroxide and diisopropylbenzene hydrogen peroxide.

The salts or complexes of transition metals are those which catalyze the oxidative hardening of drying oils and are known as siccatives. They are usually calcium, copper, zinc, magnesium, manganese, lead, cobalt, iron, vanadium or zirconium salts of higher aliphatic (8–30 C) carboxylic acids and naphthenic acids. Cobalt and manganese salts are preferred, such as cobalt octoate, cobalt naphthenate, cobalt acetylacetonate and the corresponding manganese salts.

The aromatic amines which may optionally be used as polymerization accelerators are well known for this purpose. Examples are aniline, N,N-dimethyl- or N,N-diethylaniline, corresponding toluidines and p-dimethylaminobenzaldehyde, these are preferably used in quantities of 0.1 to 6, more preferably 0.1 to 2 percent by weight, based on the weight of the monomer components.

Such a catalyst system preferably consists of a peroxide or hydrogen peroxide, an aromatic amine and a transition metal salt.

The compositions according to the invention preferably contain an essentially dry aggregate, which preferably comprises 40–95% by weight of the total composition. Any inorganic compound which is inert towards acids, bases and salts may be considered as the aggregate. For example, sand, gravel or coarser aggregate materials of types normally employed in flooring compositions and the like may be employed. For coatings, fine aggregates such as fine sand, possibly mixed with silica fume, may be employed. These various constituents may be added shortly before application of the monomer composition, or may be contained in various packages, which are storage-stable. For example, the aggregate, the various monomers with the optional polymerization accelerators and the polymerization catalyst with the transition metal salt may be delivered in separate packages, which may be mixed together shortly before use. Depending on the catalyst employed, the catalyst system (without accelerator) may also be pre-mixed with the aggregate, or the monomer mixture may be pre-mixed with the aggregate.

In addition to binder (and usually aggregate), the composition of the invention also comprises a third component which is at least one of two other materials, carbon black and oligomer, whose parameters will now be described.

The carbon black has a BET surface area of from 20–400 $M^2/g$ and is present to the extent of from 0.01–7%, preferably 0.01–3.0%, more preferably 0.1–0.5%, by weight of the acrylic binder. Materials such as gas black, lamp black and furnace black may be used.

The carbon black has the effect of reducing the deleterious effect of oxygen, especially at the surface, and pot life and tack-free time are substantially improved without any impairment of the properties of the final polymer. The reactivity of the monomer composition is also improved.

The oligomers used in compositions according to the invention are aliphatic and aromatic polyester- and polyether-urethanes having at least two unsaturated double bonds, preferably at least three such bonds, so that they are capable of crosslinking with acrylic binders. Preferred oligomers have molecular weights in the range of from 500–5000, preferably 500–2000, more preferably 1000–2000, and most preferably 1000–1400 and viscosities of 2,000–100,000, more preferably 12,000–100,000, and most preferably 60,000–75,000 mPa s (at 25° C.). Such oligomers may be made, for example, by the reaction of carboxyl groups of acrylic acid or methacrylic acid monomer with a polyester- or polyether-urethane. This can be done during or after the preparation of the polyester- or polyether- urethane. Examples of suitable oligomers which are useful in the working of this invention are:

| NAME | SOURCE | NATURE | MW | VISCOSITY |
|---|---|---|---|---|
| GENOMER T1200 | Rahn AG Zürich | aliphatic, triacrylate | 1000–1200 | 70,000 |
| GENONER T1600 | | aliphatic, triacrylate | ~1600 | 52,000 |
| GENONER D1500 B | | aliphatic, diacrylate | | |
| EBECRYL 205 | UCB Belgium | aromatic triacrylate | 2,000 | 30,000 |
| EBECRYL 210 | UCB Belgium | aromatic diacrylate | 1,500 | 4,000 |
| EBECRYL 1259 | UCB Belgium | aliphatic triacrylate | 2,000 | 14,000 |
| EBECRYL 1290 | UCB Belgium | aliphatic hexaacrylate | 1,000 | 2,000 |

When an oligomer is used as component (b), compounds of formula I comprise 20–93%, preferably 50–80%, other (meth)acrylates comprise up to 73%, preferably 7–37% and oligomer comprises 7–60%, preferably 13–40% by total weight of acrylic binder and oligomer.

In an especially preferred embodiment, the compositions according to the invention comprise both carbon black and oligomer.

The composition of the present invention display an especially high affinity for cementitious substrates, such as concrete. The invention therefore provides cementitious substrate-adherent compositions comprising a hardenable monomer composition as hereinabove defined. In particular, the cementitious substrate-adherent compositions of the present invention encompass a number of embodiments including but not limited to:

flooring compositions for cementitious substrates;

repair compositions for filling cracks and fissures in cementitious substrates; and adhesives for the adhering together two or more cementitious substrates.

The acrylic monomer binder used in the cementitious substrate-adherent compositions preferably includes an acrylated epoxy monomer to provide enhanced alkaline resistance.

The invention further provides:

(1) a method of forming a floor on a cementitiious substrate comprising applying to said cementitious substrate a hardenable flooring composition comprising (a) an acrylic monomer binder which comprises a (meth) acrylic ester of the Formula I

$$CH_2=C-C-(OR_1)_n-OR_2 \qquad (I)$$
$$\phantom{CH_2=}| \phantom{-}||$$
$$\phantom{CH_2=}R \phantom{-}O$$

wherein

R is hydrogen or methyl;

$R_1$ is $C_{2-6}$ alkylene;

n is an integer of from 0–3; and $R_2$ is a radical of an aromatic or alicyclic dicarboxylic acid ester or a dicyclopentenyl radical, n being able to be 0 only when $R_2$ is a dicyclopentenyl radical; and (b) at least one component selected from the group consisting of
  (i) carbon blacks with a BET surface area of from 20–460 M²/g, this being present to the extent of from 0.01–7, preferably 0.01–3, more preferably 0.1–0.5, weight % of the acrylic monomer; and
  (ii) aliphatic and aromatic polyester- and polyetherurethane oligomers of molecular weight 500–5000 and a viscosity of 2,000–100,000 mPa s at 25° C., having at least two ethylenically unsaturated double bonds, said oligomer being present in an amount of 7–60% by weight, said weight based on the total weight of the acrylic binder and oligomer;

(c) an effective amount of a polymerization catalyst for the acrylic monomer binder; and (d) an inert aggregate in an amount of 40–95% by weight of the total composition of a, b, c and d, and allowing said flooring composition to harden.

(2) A method of adhering together at least two cementitious substrates comprising applying a hardenable adhesive composition to a surface of at least one cementitious substrate to form an adhesive coated surface, bringing said adhesive coated surface into contact with a surface of the second cementitious substrate and allowing the adhesive composition to harden, said adhesive composition comprising (a) an acrylic monomer binder which comprises a (meth)acrylic ester of the Formula I

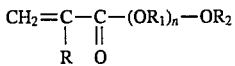  (I)

wherein

R is hydrogen or methyl;

$R_1$ is $C_{2-6}$alkylene;

n is an integer of from 0–3; and $R_2$ is a radical of an aromatic or alicyclic dicarboxylic acid ester or a dicyclopentenyl radical, n being able to be 0 only when $R_2$ is a dicyclopentenyl radical; and (b) at least one component selected from the group consisting of
  (i) carbon blacks with a BET surface area of from 20–460 M²/g, this being present to the extent of from 0.01–7, preferably 0.01–3, more preferably 0.1–0.5, weight % of the acrylic monomer; and
  (ii) aliphatic and aromatic polyester- and polyetherurethane oligomers of molecular weight 500–5000 and a viscosity of 2,000–100,000 mPa s at 25° C., having at least two ethylenically unsaturated double bonds, said oligomer being present in an amount of 7–60% by weight, said weight based on the total weight of the acrylic binder and oligomer;

(c) an effective amount of a polymerization catalyst for the acrylic monomer binder; and (d) an inert aggregate in an amount of 40–95% by weight of the total composition of a,b, c and d.

(3) A method of repairing cracks and fissures in a cementitious substrate comprising applying to said cracks and fissures a hardenable repair composition comprising (a) an acrylic monomer binder which comprises a (meth)acrylic ester of the Formula I

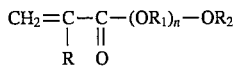  (I)

wherein

R is hydrogen or methyl;

$R_1$ is $C_{2-6}$alkylene;

n is an integer of from 0–3; and $R_2$ is a radical of an aromatic or alicyclic dicarboxylic acid ester or a dicyclopentenyl radical, n being able to be 0 only when $R_2$ is a dicyclopentenyl radical; and (b) at least one component selected from the group consisting of
  (i) carbon blacks with a BET surface area of from 20–460 M²/g, this being present to the extent of from 0.01–7, preferably 0.01–3, more preferably 0.1–0.5, weight % of the acrylic monomer; and
  (ii) aliphatic and aromatic polyester- and polyetherurethane oligomers of molecular weight 500–5000 and a viscosity of 2,000–100,000 mPa s at 25° C., having at least two ethylenically unsaturated double bonds, said oligomer being present in an amount of 7–60% by weight, said weight based on the total weight of the acrylic binder and oligomer;

(c) an effective amount of a polymerization catalyst for the acrylic monomer binder; and (d) an inert aggregate in an amount of 40–95% by weight of the total composition of a, b, c and d, and allowing said repair composition to harden.

Apart from good water resistance and heat resistance, the polymeric compositions obtained from the hardening of the monomeric compositions according to the invention are especially notable for their increased resistance to impact, their compression strength and flexural strength, and their outstanding adhesive strength.

The invention is further described with reference to the following examples in which the parts and percentages are by weight.

Component I is an ester of tetrahydrophthalic acid monomethyl ester and hydroxypropyl methacrylate. Component II is a hydroxypropyl methacrylate. The oligomer is the product GENOMER T 1200 from Rahn AG, Zürich.

The carbon black used is a furnace black with a BET surface area of 80 m²/g ("Printex" 300 from the company Degussa AG).

The pot life and absence of tackiness of the polymeric concrete mass obtained are determined at room temperature.

Examples 1–7 (Table 1) show the advantages of the use of carbon black in the proportions of the invention.

Examples 8–14 (Table 2) show the advantages of the addition of oligomer according to the invention. The impact resistance (in milliJoules/sq. cm.) and the flexural and compression strengths (both in Newtons/sq. mm.) are determined by standard methods widely used in the art.

Examples 15–24 (Table 3) show the advantages of the use of both carbon black and oligomer.

TABLE 1

| Preparation | Ex. 1 | Ex. 2 | Ex. 3 | Ex. 4 | Ex. 5 | Ex. 6 | Ex. 7 |
|---|---|---|---|---|---|---|---|
| (for comparison) | | | | | | | |
| component I | 10 | 10 | 10 | 10 | 15 | 15 | 15 |
| component II | 5 | 5 | 5 | 5 | — | — | — |
| carbon black | — | 0.02 | 0.1 | 1 | 0.02 | 0.1 | 1 |
| cobalt naphthenate | 0.15 | 0.15 | 0.15 | 0.15 | 0.15 | 0.15 | 0.15 |
| benzoyl peroxide | 0.8 | 0.8 | 0.8 | 0.8 | 0.8 | 0.8 | 0.8 |
| standard sand (1 mm maximum size) | ca. 54 | ca. 54 | ca. 54 | ca. 54 | ca. 54 | ca. 54 | ca. 54 |
| quartz sand (0.1–0.3 mm) | ca. 26 | ca. 26 | ca. 26 | ca. 26 | ca. 26 | ca. 26 | ca. 26 |
| quartz sand (0.04–0.1 mm) | 5 | 5 | 5 | 5 | 5 | 5 | 5 |
| pot life | >1 day | 50 min | 10–15 min | 10 min | 50 min | 5–10 min | 5–8 min |
| absence of tackiness | >36 hrs | 12–24 hrs | 10 hrs | 5 hrs | 12–24 hrs | 10 hrs | 5–10 hrs |

TABLE 2

| Preparation | Ex. 8 | Ex. 9 | Ex. 10 | Ex. 11 | Ex. 12 | Ex. 13 | Ex. 14 |
|---|---|---|---|---|---|---|---|
| (for comparison) | | | | | | | |
| component I | 15 | 13 | 11 | 6 | 8 | 6 | 4 |
| component II | — | — | — | — | 4 | 3 | 2 |
| oligomer | — | 2 | 4 | 9 | 3 | 6 | 9 |
| cobalt naphthenate | 0.15 | 0.15 | 0.15 | 0.15 | 0.15 | 0.15 | 0.15 |
| benzoyl peroxide | 0.8 | 0.8 | 0.8 | 0.8 | 0.8 | 0.8 | 0.8 |
| standard sand (1 mm maximum size) | ca. 54 | ca. 54 | ca. 54 | ca. 54 | ca. 54 | ca. 54 | ca. 54 |
| quartz sand (0.1–0.3 mm) | ca. 26 | ca. 26 | ca. 26 | ca. 26 | ca. 26 | ca. 26 | ca. 26 |
| quartz sand (0.04–0.1 mm) | 5 | 5 | 5 | 5 | 5 | 5 | 5 |
| resistance to impact | 80 | 190 | 193 | 250 | 170 | 200 | 240 |
| flexural strength | 17 | 27 | 29 | 27 | 31 | 34 | 32 |
| compression strength | 46 | 54 | 58 | 68 | 70 | 71 | 70 |

TABLE 3

| Preparation | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|
| component I | 7.3 | 7.3 | 7.3 | 7.3 | 10 | 10 | 10 | 7.8 | 10 | 10 |
| component II | 3.7 | 3.7 | 3.7 | 3.7 | — | — | — | 5.2 | — | — |
| oligomer | 4 | 4 | 4 | 4 | 4 | 4 | 4 | 4 | 4 | 4 |
| carbon black | 0.02 | — | 0.1 | 1 | 0.02 | 0.1 | 0.5 | 0.5 | 0.02 | — |
| DMAB* | — | — | — | — | — | — | — | — | 0.42 | 0.42 |
| cobalt naphthenate | 0.15 | 0.15 | 0.15 | 0.15 | 0.15 | 0.15 | 0.15 | 0.15 | 0.15 | 0.15 |
| benzoyl peroxide | 0.8 | 0.8 | 0.8 | 0.8 | 0.8 | 0.8 | 0.8 | 0.8 | 0.75 | 0.75 |
| TiO₂ | — | — | — | — | — | — | — | — | 6 | 6 |
| sand | ca. 85 | — | — | — | — | — | — | ca. 82 | 78.66 | 78.66 |
| pot life | 40 min | >4 day | 20 min | <2 min | 190 min | 31 min | 5 min | — | 10–15 min | 30 min |
| absence of tackiness | 1 day | ca. 6day | 2 day | 1–2 hr | — | — | — | — | 90 min | 500 min |

*DMAB = p-dimethylaminobenzaldehyde

I claim:

1. A hardenable monomer composition suitable for use in flooring and concrete surface coating compositions, comprising (a) an acrylic monomer binder which comprises a (meth) acrylic ester of Formula 1

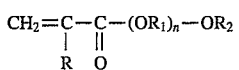

wherein R is hydrogen or methyl; $R_1$ is $C_{2-6}$ alkylene; n is an integer of from 0–3; and $R_2$ is a radical of an aromatic or alicyclic dicarboxylic acid ester or a dicyclopentenyl radical, n being 0 only when $R_2$ is a dicyclopentenyl radical;

(b) carbon black having a BET surface area of from 20–460 M²/g, and being present to the extent of from 0.01–7 weight % of the acrylic monomer binder; and optionally, (c) at least one aliphatic or aromatic polyester- or polyetherurethane oligomer of molecular weight 500–5000 and a viscosity of 2,000–100,000 mPa s at 25° C., having at least two ethylenically unsaturated double bonds, said oligomer being present in an amount of 7–60% by weight said weight based on the total weight of the acrylic binder and oligomer.

2. A hardenable monomer composition according to claim 1, wherein carbon black is present to the extent of from 0.01–3 weight % of the acrylic monomer binder.

3. A hardenable monomer composition according to claim 2, wherein carbon black is present to the extent of from 0.1–0.5 weight % of the acrylic monomer binder.

4. A hardenable monomer composition according to claim 1, wherein R is methyl, $R_1$ is a branched $C_{3-4}$alkylene, n is 1 and $R_2$ is the radical of a tetrahydrophthalic acid which has been esterified with an alkanol.

5. A hardenable monomer composition according to claim 4, wherein the alkanol is a $C_{1-6}$alkanol.

6. A hardenable monomer composition according to claim 5, wherein the alkanol is methanol or ethanol.

7. A hardenable monomer composition according to claim 1 wherein the acrylic monomer binder additionally comprises (meth)acrylic esters other than those according to Formula 1 to the extent of up to 80% by weight of total acrylic monomer binder.

8. A hardenable monomer composition according to claim 7, wherein the acrylic monomer binder comprises (meth)acrylic esters other than those according to Formula 1 to the extent of from 514 50% by weight of total acrylic monomer binder.

9. A hardenable monomer composition according to claim 1 wherein the composition includes at least one aromatic polyester- or polyether-urethane oligomer and there is present in the composition from 20–93% of esters according to Formula 1, 0 to 73% of (meth)acrylic acid esters other than those according to Formula 1, and from 7–60% by weight of said oligomer, all by weight of the total weight of binder and oligomer.

10. A hardenable monomer composition according to claim 9, wherein there is present in the composition from 50–80% by weight of the total weight of binder and oligomer of esters according to Formula 1.

11. A hardenable monomer composition according to claim 10, wherein there is present in the composition from 7–37% by weight of the total weight of binder and oligomer of (meth)acrylic acid esters other than those according to Formula 1.

12. A hardenable monomer composition according to claim 11, wherein the oligomer is present in an amount of from 13–40% by weight based on the total weight of binder and oligomer.

13. A hardenable monomer composition according to claim 8, wherein the (meth)acrylic esters other than those according to Formula 1 are hydroxyalkyl methacrylates.

14. A hardenable monomer composition according to claim 11, wherein the (meth)acrylic esters other than those according to Formula 1 are hydroxyalkyl methacrylates.

15. A hardenable monomer composition according to claim 9, wherein monomer according to formula I is present to the extent of from about 46–71% by weight of acrylic monomer binder and oligomer, monomer other than that according to formula I is present to the extent of from about 0–29% by weight of acrylic monomer binder and oligomer, carbon black is present to the extent of from about 0.18–5% by weight of acrylic monomer binder, and the oligomer is present to the extent of from about 23–29% by weight of acrylic monomer binder and oligomer.

* * * * *